United States Patent
Dull et al.

(10) Patent No.: US 6,325,963 B1
(45) Date of Patent: Dec. 4, 2001

(54) METHOD FOR FIRING CERAMIC HONEYCOMB BODIES

(75) Inventors: Alan T. Dull, Elmira, NY (US); Thomas S. Hinkle, Wellsboro, PA (US); Christopher S. Witte, Beaver Dams, NY (US); Edward F. Zunic, Dublin, VA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/612,769

(22) Filed: Jul. 10, 2000

Related U.S. Application Data

(63) Continuation-in-part of application No. 09/203,614, filed on Dec. 1, 1998, now Pat. No. 6,089,860.
(60) Provisional application No. 60/068,487, filed on Dec. 22, 1997.

(51) Int. Cl.$^7$ .................................................. C04B 33/32
(52) U.S. Cl. ........................ 264/631; 264/630; 264/656
(58) Field of Search .................... 264/630, 631, 264/656

(56) References Cited

U.S. PATENT DOCUMENTS

| | | | |
|---|---|---|---|
| 3,706,289 | * 12/1972 | Brewer | 110/236 |
| 3,744,965 | 7/1973 | Remmey et al. . | |
| 3,865,540 | * 2/1975 | Loeffler | 432/2 |
| 4,005,981 | 2/1977 | Turnbull . | |
| 4,051,231 | 9/1977 | Bond et al. . | |
| 4,128,394 | 12/1978 | Naito et al. . | |
| 4,133,636 | * 1/1979 | Flynn | 432/222 |
| 4,176,162 | * 11/1979 | Stern | 423/245.3 |
| 4,235,830 | 11/1980 | Bennett et al. . | |
| 4,269,592 | * 5/1981 | Benton et al. | 432/19 |
| 4,291,471 | 9/1981 | Bloom . | |
| 4,340,555 | 7/1982 | Procter . | |
| 4,404,166 | * 9/1983 | wiech, Jr. | 419/36 |
| 4,474,731 | 10/1984 | Brownlow et al. . | |
| 4,508,669 | * 4/1985 | Iwai et al. | 264/36 |
| 4,784,603 | * 11/1988 | Robak, Jr. et al. | 432/59 |
| 4,789,332 | * 12/1988 | Ramsey et al. | 432/59 |

(List continued on next page.)

FOREIGN PATENT DOCUMENTS

| | | |
|---|---|---|
| 0 709 638 A2 | 5/1996 | (EP) . |
| 10-274484 | 10/1998 | (JP) . |
| 10-274486 | 10/1998 | (JP) . |

OTHER PUBLICATIONS

"Retrofitting Tunnel Kilns", The American Ceramic Society Bulletin, J.J. Lukacs pp. 48–52.

"Pulse/Proportional Jet Firing at Work", Ceramic Industry, Carboy et al.

"Jet Firing with Pulse/Proportional Control", American Ceramic Society Bulletin, vol. 73, No. 3, Mar. 1994, pp. 93–96.

*Primary Examiner*—Christopher A. Fiorilla
(74) *Attorney, Agent, or Firm*—Timothy M. Schaeberle; Anca C. Gheorghiu

(57) ABSTRACT

The invention relates to a method of firing a green ceramic honeycomb structural body containing an organic or carbonaceous material which is characterized by removing at least a portion of the carbonaceous material released prior to reacting within the firing atmosphere during the initial firing of the green honeycomb structural body. The invention also relates to a tunnel kiln, which includes a vestibule region, a carbonaceous material release region, having a plurality of removal zones, located downstream of the vestibule region and a sintering region located downstream of the carbonaceous material release region. The tunnel kiln further includes an exhaust removal system which operatively communicates, via offtake openings located in each removal zone, with the release region for removing released carbonaceous material.

4 Claims, 4 Drawing Sheets

U.S. PATENT DOCUMENTS

| | | |
|---|---|---|
| 4,795,598 | 1/1989 | Billiet . |
| 4,884,969 | 12/1989 | Kolln et al. . |
| 4,927,577 | 5/1990 | Ohtaka et al. . |
| 4,990,086 | 2/1991 | Eustacchio . |
| 4,994,436 * | 2/1991 | Giacobbe ................................ 505/1 |
| 5,044,944 | 9/1991 | Furuya et al. . |
| 5,046,946 | 9/1991 | Yasuda et al. . |
| 5,078,929 | 1/1992 | Matsumae et al. . |
| 5,183,609 | 2/1993 | Miyahara . |
| 5,248,255 | 9/1993 | Morioka et al. . |
| 5,252,272 | 10/1993 | Yavuz et al. . |
| 5,266,027 | 11/1993 | Kuwayama . |
| 5,409,870 | 4/1995 | Locker et al. . |
| 5,419,857 | 5/1995 | Van den Sype . |
| 5,578,147 | 11/1996 | Nayar et al. . |
| 5,635,121 * | 6/1997 | Huntt .................................. 264/648 |
| 5,823,767 * | 10/1998 | Watanabe et al. ..................... 432/72 |
| 6,027,684 * | 2/2000 | Gheorghiu et al. .................. 264/631 |

\* cited by examiner

METHOD FOR FIRING CERAMIC HONEYCOMB BODIES

This application is a continuation-in-part of application Ser. No. 09/203,614, filed Dec. 1, 1998, now U.S Pat. No. 6,089,860, which claims the benefit of U.S. Provisional Application Serial No. 60/068,487, filed Dec. 22, 1997, entitled "METHOD FOR FIRING CERAMIC HONEYCOMB BODIES AND A TUNNEL KILN USED THEREFOR", by Dull et al.

The present invention relates to a method of firing cellular ceramic bodies, and more particularly, it relates to a method of firing the cellular ceramic bodies exhibiting problematic high-organic containing batches and to a tunnel kiln adapted for such a firing process.

BACKGROUND OF THE INVENTION

Ceramic products of a honeycomb shape, or ceramic honeycomb structures, i.e., cellular ceramic bodies, have been made by preparing a ceramic green body through mixing of ceramic materials with water and various carbonaceous materials, including extrusion and forming aids to form a plasticized batch, forming the body into a honcycomb-shaped ceramic green body through extrusion of the plasticized batch, and finally firing the honeycomb-shaped ceramic green body in a firing furnace at a predetermined temperature.

Extrusion and forming aids used in the above firing of the honeycomb structure include, specifically, organic binders and plasticizers and lubricants, such as methylcelloluse, carboxymethlcellulose, polyvinyl alcohol, alkali stearates and the like. Furthermore, other carbonaceous materials such as graphite have been included in the batch as a pore-forming agent.

It is known that the carbonaceous material release or the decomposition of the carbonaceous material, is an oxidation or exothermic reaction which releases large amounts of heat. Initially the exothermic reaction occurs at the skin or outer portion of the part, resulting in an initial thermal differential whereby the outer portion of the ceramic body is hotter than the core. Subsequently, the skin or outer portion exothermic reaction dies down, and the exothermic reaction region moves into the interior of the ware. Because typical substrates are comprised of ceramic materials, for example cordierite, which are good insulators, and exhibit a cellular structure comprising numerous channels, difficulties are encountered in effectively removing, either by conduction or convection, the heat from the ceramic body. Additionally, due to the cellular structure there is considerable surface area to promote binder reaction with the $O_2$ in the firing atmosphere, thus exacerbating this interior exothermic effect. As such, during the carbonaceous material release, the ceramic body exhibits either a positive or negative thermal differential; i.e., the core of the ceramic body exhibiting either a higher or lower temperature than that of the ceramic at/near the surface. This exothermic reaction, which occurs in the 100 to 600° C. temperature range for carbonaceous materials such as an organic binder or the like, or in the 500–1000° C. temperature range if the body contains, for example, graphite, causes a significant temperature differential between the inside and outside of the part. This temperature differential in the part creates stresses in the ceramic body which may result in cracking of the part. This phenomenon is particularly true for large cellular ceramic parts or parts containing large amounts of organic materials.

Techniques for controlling and inhibiting the thermal differential and resultant crack development are well known. One technique involves reducing burner flame temperature by using excess air for burner combustion, resulting in a reduced flame to product temperature gradient and corresponding slower ware heating rates. However, the high excess air yields an undesirably high percentage oxygen-containing atmosphere that reacts with the organics thereby accelerating release and increasing the internal exothermic reaction. As such, minimization of the thermal differential which develops during organic release, must be accomplished through very slow firing schedules or, alternatively, firing schedules which are carefully matched to the particular ware in the kiln.

Use of atmosphere control in periodic-type kilns to affect carbonaceous material release is generally known. See, for example, U.S. Pat. Nos. 4,404,166 (Wiech, Jr.), 4,474, 731 (Brownlow et al.), 4,661,315 (Wiech Jr. et al.) and 4,927,577 (Ohtaka et al.). Although these methods have been shown to be effective enough for use in periodictype kilns, they are not generally considered to be effective in tunnel kilns due to the considerable influx of ambient air (20.9% oxygen) into the firing atmosphere.

The use of pulse firing technology as a substitute for proportional firing has also been disclosed as a method for controlling and inhibiting thermal gradients in periodic kilns. Pulse firing involves the use of either high fire or low fire burner output conditions only, and produces low heating rates without the use of considerable amounts of excess air (oxygen); see, for example Eur. Pat. Appl. No. 0 709 638 which discloses a method of firing ceramic formed bodies using a furnace having burners which alternate from a high to a low output firing state. Although the use of this firing technology has been somewhat effective in periodic kilns, resulting in a reduction in the incidences of cracking, this pulse firing technique poses difficulties when used in tunnel kilns. Due to the open nature of tunnel kilns it is necessary to control the ambient air ingress into the organic release zones of the kiln by other means.

Therefore, an object of the invention is to solve the above-mentioned problems of the prior art by providing an improved method and a tunnel kiln for firing ceramic honeycomb structural bodies which ensures stable production of high-quality crack-free product.

SUMMARY OF THE INVENTION

It is an object of the present invention to eliminate the above-mentioned problems, and to provide a process and a kiln for firing ceramic honeycomb structural bodies, which permits the production of ceramic honeycomb structural bodies exhibiting less cracks, a more uniform firing of the inner and outer portions of the green honeycomb structural bodies while employing short duration cycles.

The method of firing a green ceramic honeycomb structural body containing an organic or carbonaceous material is characterized by collecting and trapping, via the use of a collection trap, at least a portion of the carbonaceous material released from the body. The method next involves, subsequently, and prior to the material reacting within the firing atmosphere of the kiln, removing this collected/trapped released carbonaceous material.

The kiln according to the present invention is a tunnel kiln which comprises the following: a vestibule region; a carbonaceous material release region having a plurality of removal zones and associated carbonaceous material collection trap regions which are located downstream of the vestibule region; and a sintering region located downstream of the carbonaceous material release region. The tunnel kiln further includes an exhaust removal system which operatively communicates with the release region for removing released carbonaceous material. The exhaust removal system comprises at least one offtake opening in communication with a corresponding carbonaceous material collection trap, preferably located in the rooftop of each removal zone and operatively communicating with an exhaust fan, for removing and evacuating released and trapped carbonaceous material from the kiln release region.

BRIEF DESCRIPTION OF THE FIGURES

For a better understanding of the invention, reference is made to the attached drawings, wherein.

DETAILED DESCRIPTION OF THE INVENTION

The ceramic-firing process and apparatus according to the present invention are based on knowledge obtained by examining conventional firing kilns and their firing conditions. Conventional firing procedures used to convert the plasticized batch or ceramic green body into a ceramic product typically results in a temperature differential between the outer surface or skin and the inside or core due to the exothermic release of the organic or carbonaceous material extrusion or forming aids included in the starting batch. This organic or carbonaceous release occurs between about 100–600° C. for organic binders and extrusion aids or between about 500–1000° C. for the graphite-like materials. While the heat generated at the outer periphery or skin is more easily dissipated, though still sufficient to cause stresses which may exceed the strength of the part, the heat generated in the core of the ceramic body is more troublesome as it is not dissipated due to the cellular structure and the insulative nature of the cordieriteceramic body.

Figure 1:
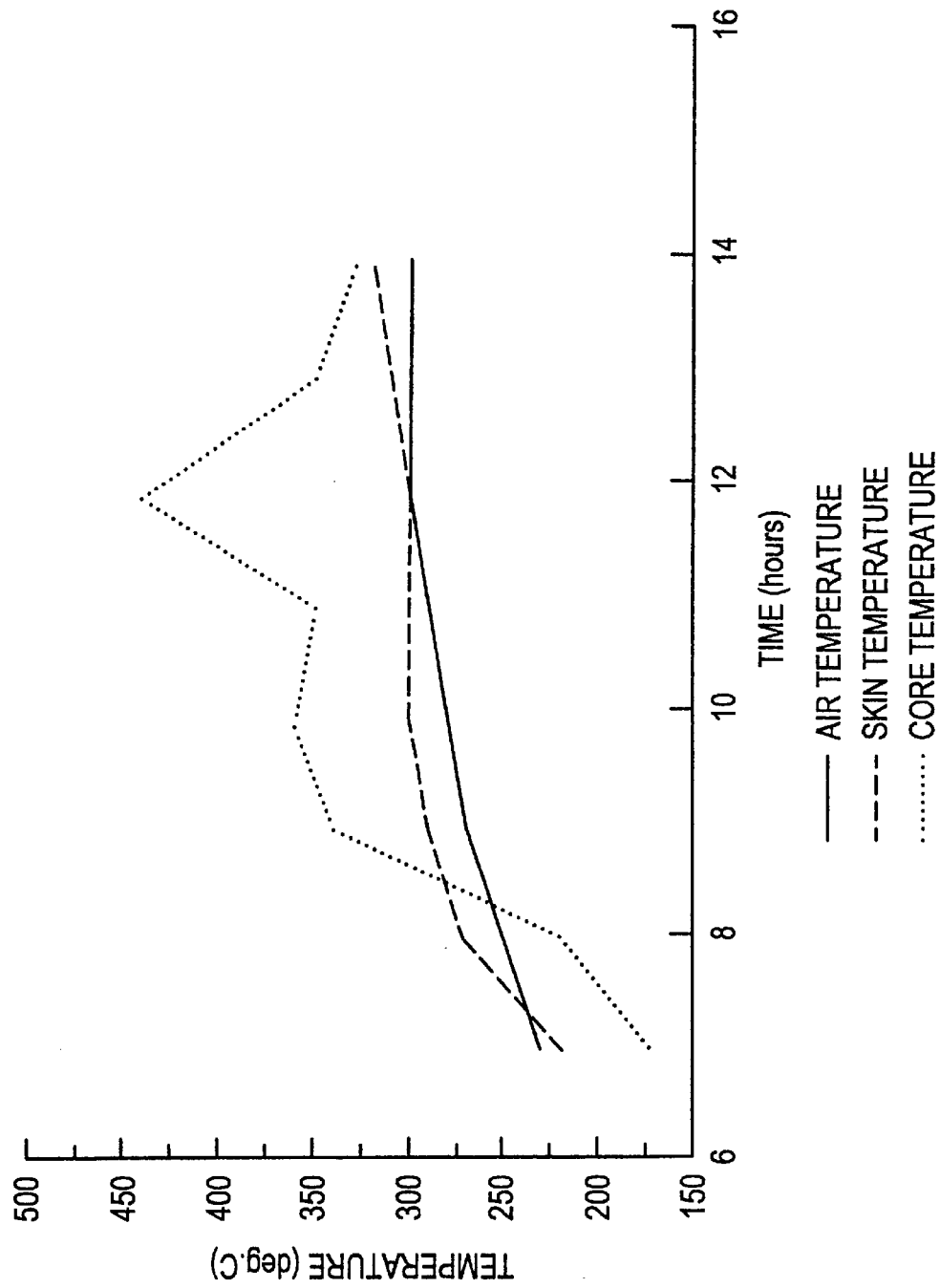
FIG. 1 is diagram representative of the differences in temperature between the core and skin of a ceramic honeycomb structural body formed and fired by conventional firing methods.

FIG. 1 illustrates a typical, undesired skin/core temperature profile, of a conventionally fired cordierite-ceramic honeycomb body; this temperature differential is such that the fired body produced tends to exhibit thermally induced deformation as well as firing cracks. As cellular bodies exhibit thinner cell walls and exhibit greater cell densities, and as more and different organic binders and graphite-like materials are used to maintain the structural integrity of these cellular bodies, this phenomenon is likely to increase.

This invention provides an effective method of producing fired honeycomb ceramic structural bodies, substantially free of any detrimental effects as a result of the release of the carbonaceous material. Specifically, the method comprises, prior to sintering, firing the ceramic green body to a temperature and for a time sufficient to substantially achieve the release of the carbonaceous material while at the same time also collecting/trapping and subsequently removing at least a portion of the released carbonaceous material prior to its downstream movement and substantial reaction in the firing atmosphere of the kiln.

The collection/trap feature prevents the gases from drifting downstream into higher temperature zones thereby avoiding situations where the gases would likely ignite and subsequently result in undesirable temperature or oxygen level kiln/firing atmosphere conditions; i.e., out-of-control temperature situations.

This invention may be applied to any ceramic material which may be detrimentally affected by carbonaceous material release; typical ceramic materials include, for example, and without limitation, cordierite and alumina-containing ceramics. The invention is hereinafter described in terms of a cordierite-containing ceramic honeycomb material, however, this should not be considered as limiting the invention to that ceramic material.

Raw materials for ceramic batches useful in the production of cordierite ceramic honeycomb structural bodies, fabricated in accordance with the invention, may be selected from any suitable source. High-purity clay, talc, silica, alumina, aluminum hydroxides and magnesia (MgO)-yielding raw materials are conventionally used for such ceramics and are satisfactory here.

The preferred batch materials in commercial use for the production of very low expansion extruded cordierite ceramic bodies are clay, talc, and alumina, with the clays typically constituting kaolinitic clays of a platey rather than stacked habit. Platey kaolins can be produced by the preprocessing of stacked kaolinite clays, or the raw material batch including the clay can be processed in a way which breaks down the crystal stacks into platelets.

Any one of a number of known techniques can accomplish the forming of the dry batch into a preform or green body suitable for conversion to cordierite by firing. Depending on the porosity desired in the cordierite product, the batch may be mixed with suitable organics and simply pressed into the shape of a preform, or it may be formed by a hot pressing method.

For the commercial manufacture of flat or thin-walled cordierite ceramic products such as ceramic honeycombs, the preferred forming technique is extrusion. A batch mixture suitable for extrusion can be prepared from the dry batch by mixing the batch with a suitable liquid vehicle. The vehicle may comprise water and carbonaceous extrusion aids necessary to give the batch plastic formability and sufficient green strength after forming to resist breakage prior to firing. Alternatively, the extrusion aids may be mixed with the ceramic batch materials.

The carbonaceous extrusion aids will normally comprise a liquid or solid hydrocarbon material having a vaporization, oxidation or decomposition temperature of below about 600° C., including for example, organic binders such as methylcelloluse, carboxymethlcellulose, polyvinyl alcohol, alkali stearates, wheat powder, starch paste, glycerin and wax. Batches of this type, which generally contain 20–35% water, are sufficiently plastic so that they can readily be formed by extrusion into preforms comprising very thin wall dimensions; i.e., less than 1 mm. The plasticized batches can also be formed conveniently by rolling or pressing, the rolled or pressed components then being either used directly or assembled into more complex shapes prior to firing.

Furthermore, the batch mixture can include other carbonaceous materials suitable for use as pore-forming agents, including but not limited to, graphite, cherry pit flower, wood chips, saw dust and starch.

In accordance with the method of the present invention, a desirable cordieriteceramic crack-free product is obtained in a two phase firing process wherein the green honeycomb structural body is initially fired to a temperature and for a time sufficient to initiate and sufficiently achieve release of the carbonaceous material. During this initial firing phase the carbonaceous material which has been incorporated in into the green honeycomb body is released in either its volatilized or partially reacted form. Carbonaceous material, e.g., binder, release typically occurs, depending on the type of organic binder, between about 100–600° C., while, on the other hand, graphite is typically released between about 500–1000° C. As such, this carbonaceous material release phase typically requires heating to a first temperature either above the first range or above the second range, depending on whether or not the ceramic body contains an amount of higher temperature carbon such as graphite. The release of volatilized or partially reacted carbonaceous material leads to subsequent undesirable heat release as a result of burning in the kiln firing space, therefore the initial firing step involves removing at least a portion of the undesirable released organic material at a point proximate to the kiln position in which it is released. In other words, the inventive method results in preventing the released carbonaceous material from substantially reacting in the firing atmosphere.

After this initial carbonaceous material removal firing phase, the ceramic green body is further conventionally fired for a time and a temperature sufficient to initiate and sufficiently achieve the conversion of the green ceramic honeycomb structural body into a fired honeycomb body whose predominant crystal phase is cordicrite. Temperatures in the range of 1340°–1450° C. are generally suitable for this purpose when the ceramic material comprises a cordierite containing ceramic.

Next, the firing kiln according to the present invention will be explained in more detail with reference to the attached drawings.

Figure 2:
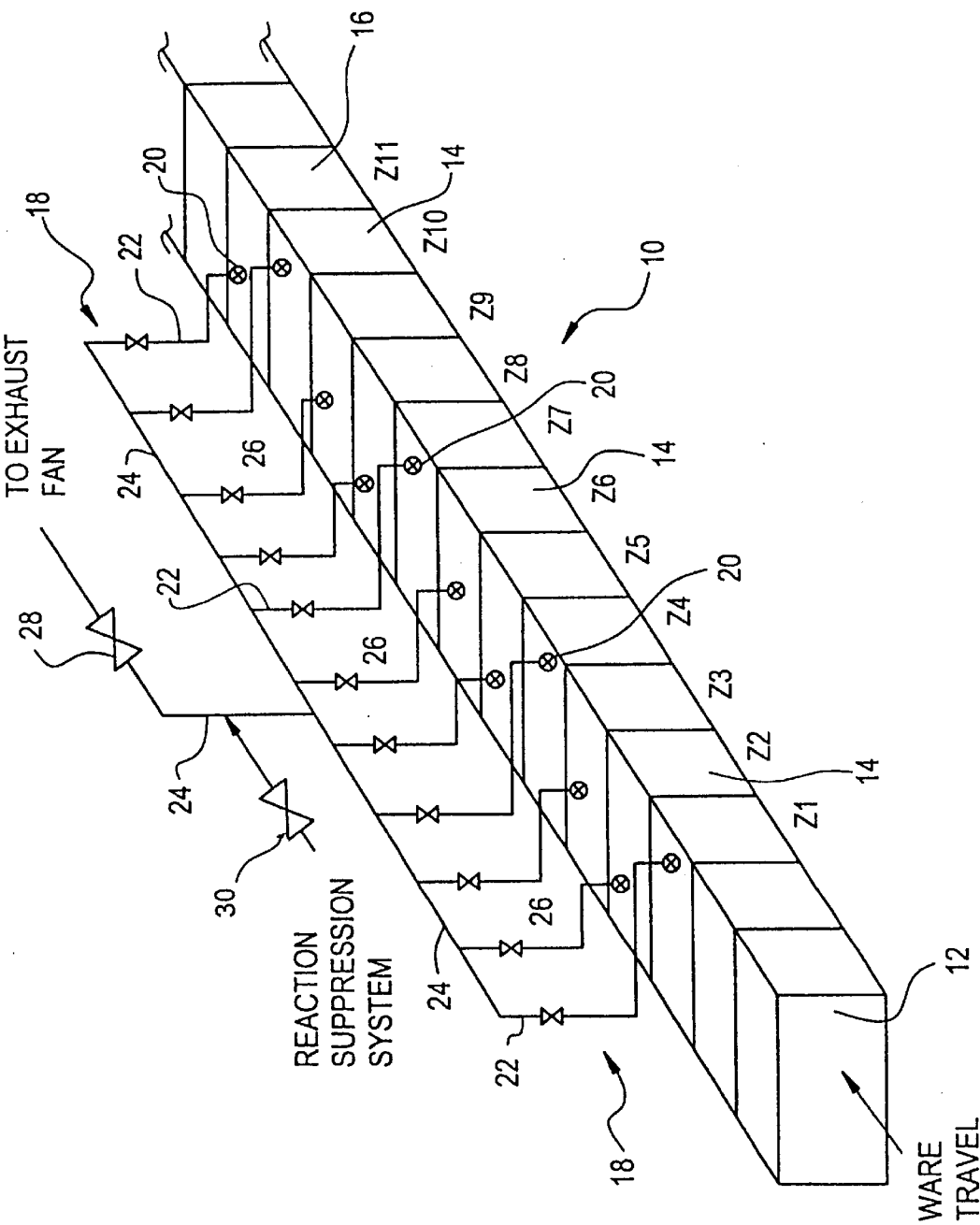
FIG. 2 is a schematic view illustrating a tunnel kiln apparatus suitably capable of being used to carry out the process for firing the ceramic honeycomb structural bodies according to the present invention.

FIG. 2 is a schematic illustrating the construction of an embodiment of the tunnel kiln for effecting the firing process according to the present invention. In this embodiment the tunnel kiln 10 comprises a vestibule region 12, a carbonaceous material release region 14, having a plurality of removal zones (z1–z11), located downstream of the vestibule region 12. Each of the removal zones includes a collection trap region (not shown) for collecting and preventing downstream movement of carbonaceous material. The kiln further comprises a sintering region 16 (partially shown) located downstream of the carbonaceous material release region 14. An exhaust removal system 18, for removing released carbonaceous material, is provided and operatively communicates with the removal zones of the release region 14.

The exhaust removal system 18 includes a plurality of offtake openings 20, specifically, at least one for each removal zone. It is these offtake openings 20, preferably located in the rooftop of the kiln for the associated removal zone, through which the released carbonaceous material, either in its volatilized or partially reacted form, is removed. Each of the offtake openings 20 operatively communicates with a secondary collector conduit 22. Although the embodiment illustrated herein details the offtakes as located in the rooftop, the important consideration regarding the location of the offtakes is that they be located in a position where the volatiles are most easily or efficiently removed, which, it should be noted may not always be the rooftop; e.g., sidewall or a position underneath the kiln.

Regarding the shape of the offtake opening, one skilled in the art can empirically determine, and thus incorporate into the tunnel kiln configuration, offtake openings of a shape which is most appropriate for the optimal and efficient removal of the released carbonaceous removal.

Each of the secondary collector conduits 22 operatively communicates with a main collector conduit 24. A damper valve 26 is preferably provided in each of the secondary collector conduits upstream of the junction where the secondary and main collector conducts communicate. An exhaust fan operatively communicates with a main collector conduit 24 and functions to place a draw on the kiln firing atmosphere necessary for evactuating the released carbonaceous material. Furthermore, a damper valve 28 is provided in the main collector conduit 24. Each of the damper valves 26 can be adjusted so as to achieve the proper individual exhaust draw in each of the removal zones z1–z11, and is this way the removal of the released carbonaceous removal can be shifted and/or varied from removal zone to removal zone. The overall control of the draw on the multiplicity of secondary conduits 26 and associated offtake openings 20 and the kiln firing atmosphere is controlled by adjustment of the damper valve 28.

The length of the release region and the length of, and the number of, the removal zones are such that they are capable of encompassing the carbonaceous material release and removal temperature range of a variety of different compositions and organic material removal requirements which changes from composition to composition: i.e., a design which is flexible so as to allow the tailoring of the exhaust profile for an overall release region which ranges between about 100 to 600° C.

It has been discovered by an examination, that conventional kilns release volatilized and/or partially reacted carbonaceous material, both of which influence the ability of the conventional kilns to maintain temperature control. The primary reason for this influence is that the released carbonaceous materials burn in the firing atmosphere, proximate to where the material is released and especially in the higher temperature downstream zones where the released material flows as a result of "crown drift". This crown drift is caused by hot gases being drawn from the higher pressure upstream zones to the lower(more negative) pressure downstream zones as a result of this pressure difference between the zone. As these released, combustible carbonaceous materials, in their volatile and/or partially reacted form, move into the higher temperature zones they react with the available oxygen and burn, releasing heat in the process. It is this heat release, which is typically greater than that required by the zone to maintain it's temperature set point, which causes the temperature in the zone is to rise above the desired temperature set point. This is very undesirable because as a result of this loss of firing process control, the ceramic honeycomb structural bodies within the kiln become cracked.

The benefit of the inventive kiln described above, is that this undesirable combustion or heat release is prevented from occurring because the kiln is designed so that some or all of this volatized or partially reacted organic material is removed from the firing atmosphere proximate to the point in the tunnel kiln ware space and thus before the released carbonaceous material has a chance to react. Specifically, the released, volatized or partially reacted, carbonaceous material, is drawn, via the exhaust fan, into the offtake openings 20 and through the secondary collector conduits 22 and thereafter through the main collector conduits 22 and thereafter through the main collector conduit 24 and ultimately through the exhaust fan whereupon it is evactuated.

Figure 3:
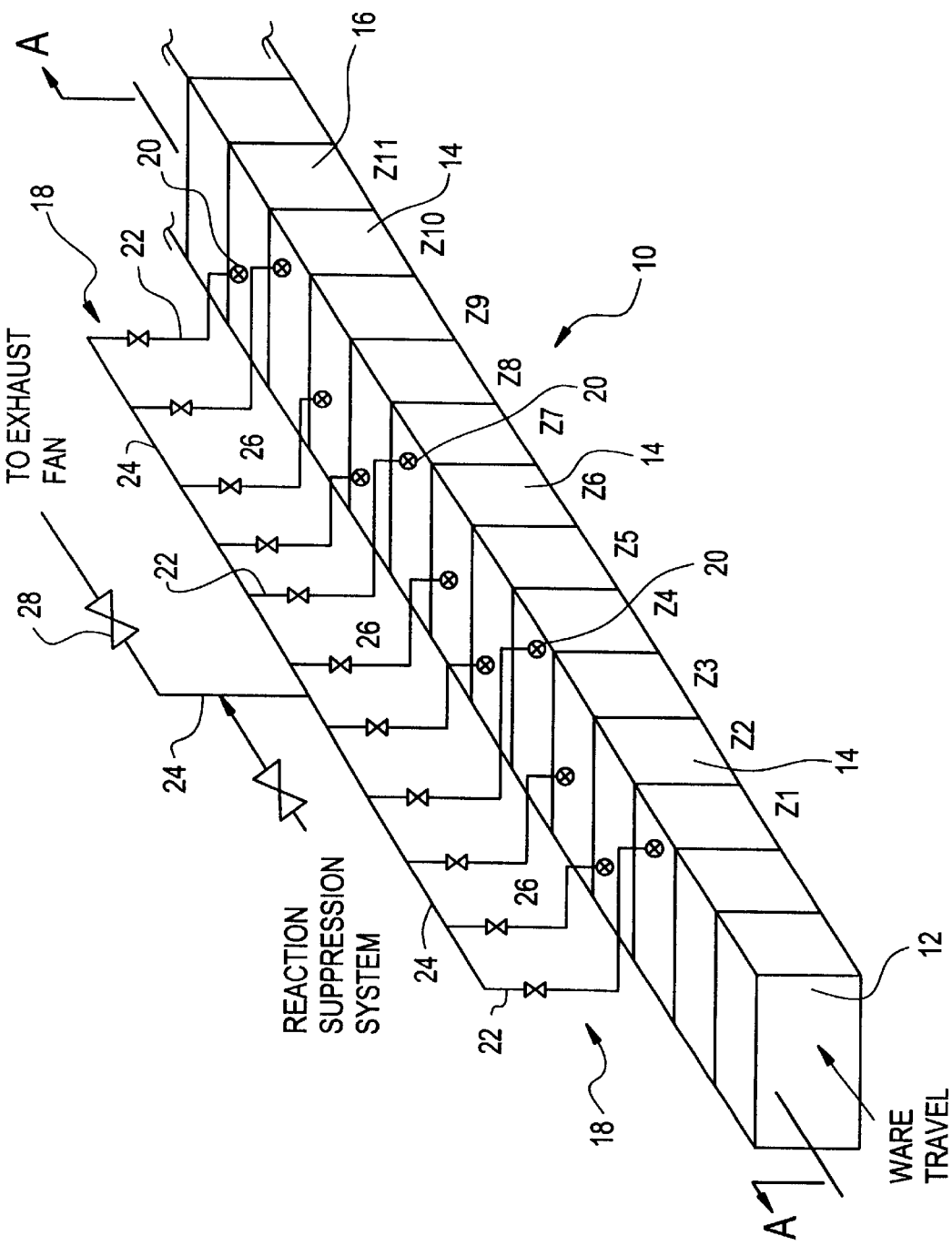
FIG. 3 is a schematic view illustrating another embodiment of a tunnel kiln apparatus suitably capable of being used to carry out the process for firing the ceramic honeycomb structural bodies according to the present invention.

FIG. 3 is a schematic illustrating the construction of an another embodiment of a tunnel kiln for effecting the firing process according to the present invention. The same reference numerals in FIG. 2 are given to the same or similar parts in FIG. 3, and explanation thereof is omitted. The embodiment of FIG. 3 differs from that of FIG. 2 in that the exhaust removal system comprises a series of 4 openings located in each of the removal zones z1–z11 for removing released, either volatized or partially reacted, carbonaceous material from the firing atmosphere. A slight modification of this embodiment comprises, rather than a series of roof offtake openings, a removal zone incorporating a continuous offtake opening; i.e., a slit in the rooftop which operatively communicates with the secondary conduit, for removing the released carbonaceous material.

Figure 4A:
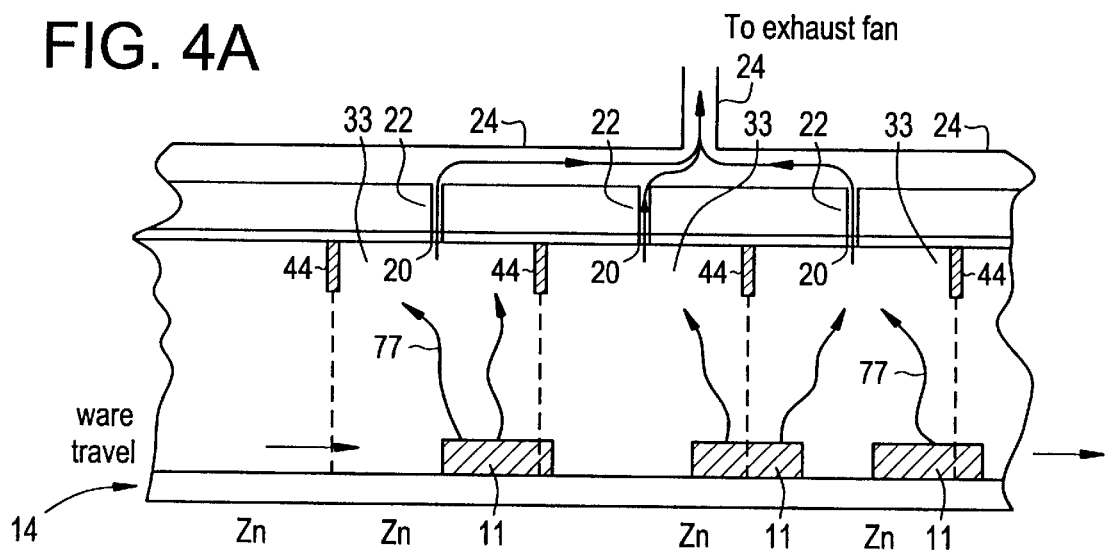
FIGS. 4A–4C are partial sectional views, along line A—A of FIG. 3, illustrating a series of removal zones and the various embodiments of the collection traps useable in the inventive tunnel kiln apparatus.

Referring to FIG. 4A, a partial sectional view of a carbonaceous material release region 14, along line A—A of FIG. 3 Illustrated therein is a first embodiment of an collection trap region of the inventive tunnel kiln apparatus. Each of the removal regions $Z_n$ includes a collection trap region 33 for collecting carbonaceous material. In this embodiment the collection trap region is comprised of a series of hanging baffles 44 that extend from the roof portion of, and down into, the removal zones. These hanging baffles 44 are comprised of a material capable of withstanding the kiln temperatures in this removal zone; suitable materials include stainless steel, refractory brick, refractory fiber blanket and/or insulating board materials. The hanging baffles 44 are placed such that they form a separate caebonaceous material collection trap region 33 for each of the successive removal zones. In this embodiment the offtake openings 20 for each of the removal zones $Z_n$ are located in the rooftop of the kiln such that they are in communication with the collection trap region 33 for each of the removal zones. Note that for the like parts of the embodiment detailed in FIG. 3 and explanation thereof is omitted.

Figure 4B:
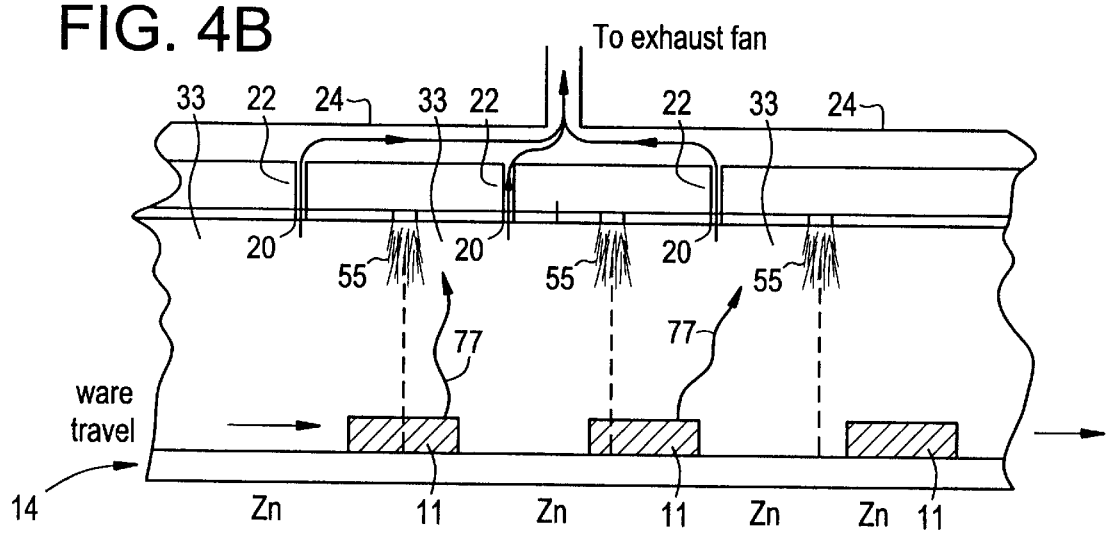

Referring to FIG. 4B, a partial sectional view of a carbonaceous material release region 14, along the line A—A of FIG. 3 Illustrated therein is a second embodiment of a collection trap region for the inventive tunnel kiln apparatus. The same reference numerals in FIG. 4A are given to the same or similar parts in FIG. 4B, and explanation thereof is omitted. The embodiment of FIG. 4b differs from that of FIG. 4A in that the collection trap region 33 is formed via a series of air knife devices that inject a stream of air or other gas (e.g., nitrogen, carbon monoxide etc.) Similar to "hanging" embodiment of FIG. 4A, the air knife device's air jet forms a separate collection trap for each of the successive removal zones. As before, offtake openings 20 for each of the removal zones are located in the rooftop of the kiln and are in communication with the carbonaceous material collection trap region 33 for each of the respective removal zones.

Figure 4C:
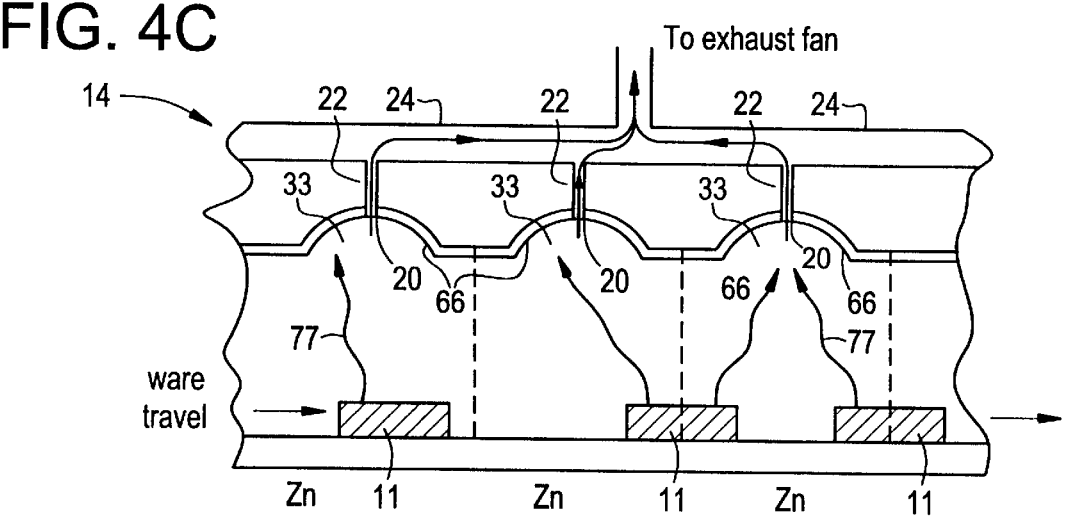

Referring to FIG. 4C, a partial sectional view of a carbonaceous material release region 14, along line A—A of FIG. 3. Illustrated therein is a third embodiment of the collection traps for the inventive tunnel kiln apparatus. The same reference numerals in FIG. 4A are given to the same or similar parts in FIG. 4C, and explanation therof is omitted. The embodiment of FIG. 4C differs from that of FIG. 4A in that the collection trap region is formed via a series of domed arches or "pockets" that the collection trap region 33 is formed via a series of domed arches or "pockets" that are provided in the roof portion of each of the removal zones. Similar to previous two embodiments of FIG. 4A and 4B, each of the removal-zones has a domed portion/"pocket" collection trap that is in communication with the offtake openings 20 located in the rooftop of the kiln.

Each of the three collection trap region embodiments generally function in the same manner as described in the following: As the ceramic ware 11 travels downstream through each of the successive carbonaceous material release region's removal zones $Z_n$, in the direction indicated by the ware travel arrows, volatized or partially reacted, carbonaceous material is released. The released carbonaceous material indicated by arrow 77 travels upward and into each of the collection trap regions 33 where it is trapped and prevented from downstream movement. As previously described, prevention of downstream carbonaceous material drift into higher temperature zones avoids undesirable temperature or oxygen level kiln/firing atmosphere conditions. Once collected and trapped the released carbonaceous material is subsequently drawn into and through the offtake opening 20 and thereafter exhausted in manner as previously described.

Referring again to FIG. 2 the tunnel kiln according to the present invention additionally may include an optional conduit reaction-suppression system. It has been observed that released carbonaceous material may condense inside the secondary 22 and main collector 24 conduits and, if conditions (oxygen level and temperature) are favorable, this material may ignite and burn uncontrolled within this conduit space. This uncontrolled burning in the conduit space duct work is undesirable, thus the inclusion of the conduit reaction-suppression system, which is designed to aid in the control of this uncontrolled conduit carbonaceous material reaction. This reaction-suppresion system comprises a temperature monitoring device and a system for introducing a low oxygen content gas into the main collector conduit 24 and secondary collector conduit 22 when the temperatures in the conduits are above a predetermined temperature. Preferably, the low oxygen gas comprises either a nitrogen or $CO_2$ enriched gas. The reaction-suppresion system operatively communicates with the main collector 24 and secondary collector conduits 22 communicate. In the tunnel kiln configuration which includes this reaction-suppression system, the damper valve 28, is located between the junction where the reaction-suppression system communicates with the main collector conduit 24 and the exhaust fan. When the damper valve 28 is fully closed, it functions both to suspend carbonaceous material removal and to isolate the secondary conduits 24 from the exhaust fan to facilitate suppression of undesirable reactions occurring in the conduit.

The reaction-suppression system specifically functions as follows: the temperature monitoring device, e.g., a thermal sensor in the main duct upstream of the main damper, is connected to an overtemperature instrument capable of comparing the duct temperature to a predetermined set point temperature. When temperature of the thermal sensor reaches the predetermined set point, which is indicative of burning in the main and or secondary collector conduits, a damper valve 30 is opened which releases a flow of low oxygen gases into the main collector conduit 24 which effectively lowers the oxygen level to a point where combustion can no longer be sustained. Simultaneously, the main collector conduit damper 28 valve is closed, thus removing the draw to the kiln firing atmosphere. The net result is the suppression of the burning reaction within the duct while at the same time stopping the inflow of the released and the potentially combustible carbonaceous materials.

It should be noted that the amount of carbonaceous removal from each of the individual removal zones and the overall system removal, which is necessary for achieving the desired firing conditions, will vary depending upon a number of factors including the composition, size and shape of the ceramic body, the ware load, and the size of the cell wall and number of cells exhibited by the ceramic body, the kiln configuration and the firing schedule utilized. As such, the removal conditions required for achieving the proper firing atmosphere and conditions should be empirically determined for each ceramic/kiln system.

As is clear from the above description, according to the ceramic honeycomb structural body firing process of the present invention and tunnel kiln used therefor, the release and removal of the carbonaceous material through the inventive exhaust removal regions and systems results in firing conditions in which structural honeycomb bodies exhibiting a lowered temperature differential between the inner portion and the outer portion of the ceramic body are attained. In other words, firing conditions which are far more conducive for producing fired ceramic honeycomb structural bodies which are free of thermal deformations and thermally induced cracks.

We claim:

1. A method for firing a green ceramic honeycomb, containing carbonaceous material, in a tunnel kiln, the method comprising:

(a) heating to a first temperature and for a time sufficient to substantially release the carbonaceous material from the green ceramic honeycomb;

(b) collecting and trapping the released carbonaceous material;

(c) removing the released carbonaceous material from the atmosphere; and, (d) heating to a second temperature and for a time sufficient to produce a fired ceramic honeycomb;

wherein the removal of the released carbonaceous material results in reduced thermally induced deformation and cracking in the fired ceramic honeycomb.

2. The method of claim 1 wherein the fired ceramic honeycomb has a predominant crystal phase of cordierite.

3. The method of claim 1 wherein the carbonaceous material comprises a liquid or solid hydrocarbon material having a vaporization, decomposition or evaporation temperature of below about 600° C.

4. The method of claim 3 wherein the carbonaceous material comprises a polymer binder, a hydrocarbon oil or wax binder or graphite.

* * * * *